United States Patent Office 3,470,340
Patented Sept. 30, 1969

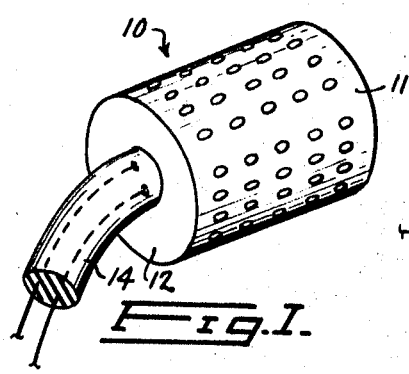
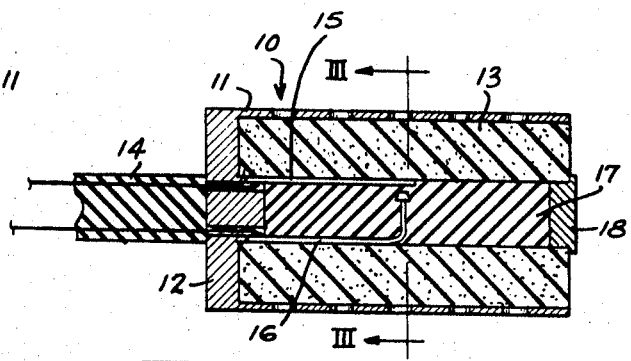
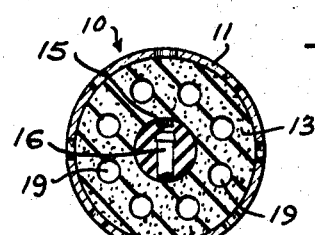
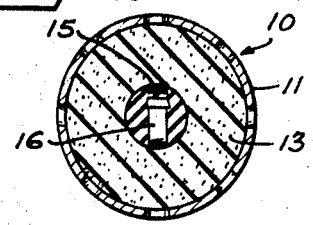
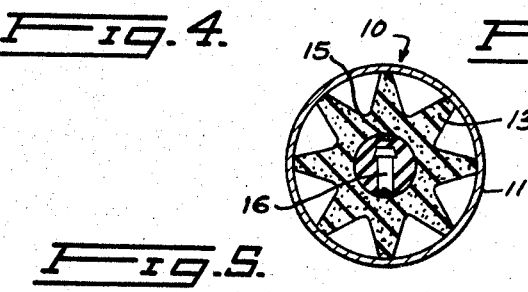
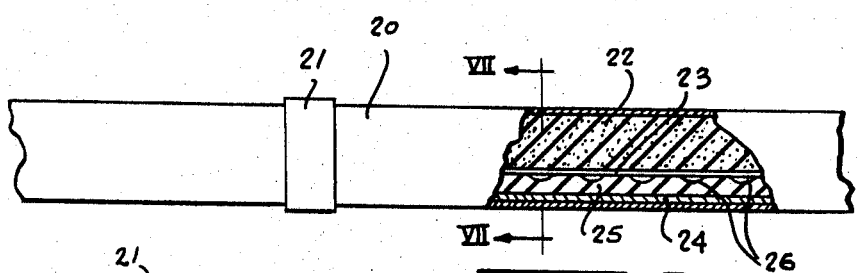
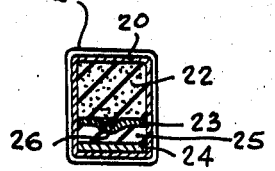

3,470,340
LEAK DETECTION APPARATUS
Leo E. Hakka, Ottawa, Ontario, Canada, assignor to
  Ernest O. Butts, Ottawa, Ontario, Canada
Filed Nov. 16, 1967, Ser. No. 683,632
Claims priority, application Canada, Sept. 13, 1965,
940,411
Int. Cl. H01h 29/02
U.S. Cl. 200—61.04                                   1 Claim

ABSTRACT OF THE DISCLOSURE

Leak detection apparatus for fuel lines and underground storage tanks comprising in combination an exteriorly encased rubber filler, said rubber filler being selected from the group consisting of butyl, isotactic polyisoprene, soft vulcanized natural rubber and soft vulcanized styrene-butadiene (SBR) rubber, a pair of electrical contacts adjacent said filler separated by an insulator and connected to a source of electricity and to a visual or audible alarm, said rubber filler being adapted on exposure to fuel oil to expand inwardly, and force said electrical contacts into engagement, actuating said visual or audible alarm.

---

The present invention relates to a method and apparatus for detecting leaks in fuel lines and underground storage tanks, such as fuel lines and storage tanks for fuel oil, gasoline, and other aliphatic or aromatic hydrocarbon base liquids.

The present invention proposes to utilize the swelling characteristics of certain orvanic materials when in contact with fuel oil or gasoline to detect leaks. Such swelling is proposed to be translated to an alarm signal and to an indication of the location of a leak in an underground pipeline through the formation or breaking of an electrical circuit.

In accordance with an embodiment of the invention there is provided a leak detecting circuit for fuel oil or gasoline pipe lines utilizing an underground twin conductor cable buried in relatively close proximity to pipe lines, the two conductors being electrically insulated from each other. Provision is made, at convenient intervals, for electrical contact between the two conductors, should the pipe line develop a leak so that fuel oil comes into contact with the cable.

The invention also provides a leak detecting module for connection to a source of electricity, including a casing and a rubber core, provision being made for closing of the electric circuit in the event of fuel oil contact with the rubber core. The invention further provides means whereby the location of a fuel oil leak may be determined through resistance measurement when an electrical circuit is formed on the said cable.

In accordance with a preferred form of the invention there is provided a leak detection apparatus for fuel lines and underground storage tanks comprising in combination an exteriorly encased rubber filler, a pair of electrical contacts within said filler separated by an insulator and connected to a source of electricity and to a visual or audible alarm, said rubber filler being at least partially exteriorly exposed, whereby when said encased rubber is contacted by fuel oil, inward expansion thereof forces said electrical contacts into engagement actuating said visual or audible alarm.

Two methods of accomplishing the foregoing objectives are included in the invention. Firstly, it is proposed that an electrical cable will be provided, at convenient intervals, with detector modules which will make electrical contact between the two connectors in the presence of fuel oil. Resistors are placed in one conductor, conveniently at each module, to make each incipient electrical circuit distinguishable by its resistance. The detector modules may be placed at regular intervals and/or at places most likely to develop a leak in a pipe line, such as joints or tees in the pipe line.

The second solution to the problem of leak detection is the provision of an electrical cable having two insulated conductors, and an adjacent soft vulcanized rubber, or soft vulcanized styrene-butadiene rubber strip, of a particular configuration as will be detailed hereinafter.

Detection apparatus according to the invention is illustrated in the attached drawings in which:

FIGURE 1 is a perspective view of a leak detector module;

FIGURE 2 is a longitudinal section of the module of FIGURE 1;

FIGURE 3 is a sectional view along line 3—3 of FIGURE 2;

FIGURE 4 is a sectional view corresponding to FIGURE 3, but of an alternative embodiment;

FIGURE 5 is a sectional view according to FIGURE 3 but of an alternative embodiment;

FIGURE 6 is a plan view, partly broken away, of a detector cable according to the invention; and FIGURE 7 is a sectional view along line 7—7 of FIGURE 6.

Referring now in detail to the drawings, in FIGURES 1, 2 and 3 a leak detector module is indicated generally at 10. A perforated outer casing 11 includes a solid front wall or base 12, of plastic or other suitable material. Contained within casing 11 is cylindrical rubber filler 13. Connected to a source of electricity is electrical terminal 14 leading to electric contacts 15 and 16 within filler 13. Separating contacts 15 and 16 is an insulator 17, preferably consisting of high melting petroleum asphalt. Plastic plug 18 is provided at the end of cylindrical rubber filler 13 at the end opposite base 12.

Cylindrical rubber filler 13 may be of butyl, isotactic polyisoprene, soft vulcanized natural rubber or soft vulcanized styrene-butadiene (SBR) rubber.

As outlined above, the detector module according to FIGURES 1 to 3 takes advantage of the swelling of certain types of rubbers in oil, gasoline, aliphatic or aromatic hydrocarbon, ether base, and ketone liquids and the like. Detector module 10 is designed to be buried adjacent a fuel pipe line, or storage tank, where, in the event of a fuel leak, cylindrical rubber filler 13 will be exposed to the fuel through perforated casing 11 of module 10, causing cylindrical rubber filler 13 to swell. Casing 11 prohibits outward swelling and forces rubber cylinder 13 to swell inwardly, forcing contact points 15 and 16 toward each other until contact is made. Insulator 17 is also susceptible to dissolution when exposed to fuels such as those itemized above, and will further prevent premature electrical contact between contacts 15 and 16, actuating a remote visual or audible alarm not illustrated.

Alternative embodiments of the leak detector module illustrated in FIGURES 4 and 5 are similar to that of FIGURES 1 to 3, and in FIGURE 4 a plurality of longitudinal holes have been provided in filler 13, whereby fuel may enter therein, thus exposing a larger surface of the rubber to the fuel, and hastening swelling and, as a result, shortening the time lapse between the commencement of a fuel leak, and the actuation of a warning signal. Similarly, the embodiment in FIGURE 5 involves the use of a rubber cylinder which is star-shaped in cross section further increasing the area of rubber exposed to leaking fuel, and, again, shortening the time lapse between the commencement of a fuel leak and the actuation of a warning signal. In both FIGURES 4 and 5 casing 11 prevents outward swelling of the rubber and forces inward swelling to effect contact between electrical contacts 15 and 16, as is true in the embodiment of FIGURES 1, 2 and 3.

The embodiment of the invention illustrated in FIGURES 6 and 7 is of a fuel oil leak detecting cable comprising a casing 20 of soft asphalt or paraffin wax. At intervals along the cable are collars 21 which serve the same purpose as casing 11 in the module described above. Electric conductors 23 and 24 are insulated by high melting petroleum asphalt 25. Conductor 23 is provided with indentations 26 at regular intervals. When cable 20 is exposed to the fuel oils enumerated above, outer asphalt coating 25 will melt, exposing rubber 22 and causing inward swelling within clamp 21 forcing contacts 23 and 24 toward each other, thus completing the electric circuit and actuating a visual or audible alarm.

The invention also contemplates that a resistor be included in the electrical circuit adjacent the module, and in the case of the cable illustrated in FIGURES 6 and 7 resistors may be conveniently located at suitable intervals. In the event of a fuel leak actuating the alarm system, the location of the leak may readily be located by a measurement of the resistance in the detecting circuit utilizing a Wheatstone bridge. Calibration at the time of construction will enable an attendant readily to measure the resistance of each circuit, and by simple comparison of the anticipated resistance of each incipient circuit, to pinpoint the location of the leak.

Copending Canadian application Ser. No. 978,842, filed Dec. 23, 1966, in the name of Ernest O. Butts, the assignee of the present application, describes and claims a pipeline leak detection device utilizing a pair of conductors positioned beneath a pipe and spaced apart by an insulation which is degradable by the fluid contained within the pipe and which is substantially impervious to ground water or other liquids which may contact the insulation during use.

The embodiments of the invention in which an exclusive property or privilege is claimed are defined as follows:

1. Leak detection apparatus for fuel lines and underground storage tanks comprising in combination a cable consisting of an outer casing of a material selected from the group consisting of soft asphalt and paraffin wax, and a rubber filler within said casing, said rubber filler being selected from the group consisting of butyl, isotactic polyisoprene, soft vulcanized natural rubber and soft vulcanized styrene-butadiene (SBR) rubber, a pair of electrical contacts adjacent said filler separated by an insulator and connected to a source of electricity and to a visual or audible alarm, said pair of electrical contacts being formed by a pair of electrical conductors within said casing adjacent said rubber filler, said insulator separating said pair of electrical contacts being selected from the group consisting of high melting petroleum asphalt and paraffin wax, and at least one exterior clamp encasing said outer casing and said rubber filler, said rubber filler being adapted on exposure to fuel oil to expand inwardly, and force said electrical contacts into engagement, actuating said visual or audible alarm.

References Cited

UNITED STATES PATENTS 2,432,367    12/1947    Andresen _____ 200—61.04

H. O. JONES, Primary Examiner